United States Patent
Vienonen et al.

(10) Patent No.: US 9,149,998 B2
(45) Date of Patent: Oct. 6, 2015

(54) ATTACHING WINDOW ASSEMBLY USING OPTICAL WELDING

(71) Applicant: Nokia Corporation, Espoo (FI)

(72) Inventors: Juha O. Vienonen, Halikko (FI); Sami Ihme, Oulu (FI); Jukka P. Eerikainen, Tampere (FI); Harri Olavi Kylmanen, Liminka (FI)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 13/659,042

(22) Filed: Oct. 24, 2012

(65) Prior Publication Data

US 2014/0113116 A1    Apr. 24, 2014

(51) Int. Cl.

| | |
|---|---|
| *B32B 3/10* | (2006.01) |
| *B32B 3/02* | (2006.01) |
| *B32B 7/04* | (2006.01) |
| *B32B 7/12* | (2006.01) |
| *B32B 17/10* | (2006.01) |
| *B29C 65/00* | (2006.01) |
| *G02F 1/1333* | (2006.01) |
| *B29C 65/16* | (2006.01) |
| *B29C 65/76* | (2006.01) |
| *B29L 31/34* | (2006.01) |

(52) U.S. Cl.
CPC ............... *B32B 3/10* (2013.01); *B29C 65/1635* (2013.01); *B29C 65/1654* (2013.01); *B29C 66/112* (2013.01); *B29C 66/114* (2013.01); *B29C 66/54* (2013.01); *B32B 3/02* (2013.01); *B32B 7/04* (2013.01); *B32B 7/12* (2013.01); *B32B 17/10* (2013.01); *G02F 1/133308* (2013.01); *B29C 65/1616* (2013.01); *B29C 65/1638* (2013.01); *B29C 65/1674* (2013.01); *B29C 65/76* (2013.01); *B29C 66/301* (2013.01); *B29C 66/71* (2013.01); *B29C 66/7212* (2013.01); *B29L 2031/3475* (2013.01); *G02F 2001/133331* (2013.01); *G02F 2203/11* (2013.01); *Y10T 428/24868* (2015.01)

(58) Field of Classification Search
CPC ...... B32B 3/10; B32B 7/045; B29C 35/0805; B29C 2035/0838
USPC ....................................... 428/195.1, 201, 203
See application file for complete search history.

(56) References Cited

U.S. PATENT DOCUMENTS

| | | | |
|---|---|---|---|
| 6,210,507 B1 | 4/2001 | Hansen et al. | ................. 156/109 |
| 2007/0194086 A1* | 8/2007 | Yuura | ............................ 228/101 |

(Continued)

FOREIGN PATENT DOCUMENTS

| | | |
|---|---|---|
| EP | 1 209 880 A2 | 5/2002 |
| WO | WO-2004/016202 A1 | 2/2004 |
| WO | WO-2006/048500 A1 | 5/2006 |
| WO | WO-2007/132063 A1 | 11/2007 |
| WO | WO 2011054384 A1 * | 5/2011 |

OTHER PUBLICATIONS

"Laser Welding Plastic", Precision MicroFab, http://www.precisionmicrofab.com/case-studies/laser-welding-plastic/; Jul. 16, 2012, 2 pgs.

*Primary Examiner* — Gerard Higgins

(74) *Attorney, Agent, or Firm* — Harrington & Smith

(57) ABSTRACT

The specification and drawings present a new apparatus and method for joining a window assembly (e.g., a glass window assembly) in electronic devices using optical/laser welding. A window assembly, transparent to an optical beam, may comprise an optical window such as glass window with a laminated layer (e.g., made of plastic) glued to a backside of the optical window and a back print ink layer between portions of the optical window and of the laminated layer. This window assembly may be attached to a frame such as a plastic frame, non-transparent to the optical beam, having at least one boundary with the laminated plastic layer of the window assembly using a welding joint at the at least one boundary made by the optical beam propagating transparently (with negligible optical absorption) through the window assembly and absorbed by the plastic frame.

12 Claims, 4 Drawing Sheets

(56) References Cited

U.S. PATENT DOCUMENTS

| | | | |
|---|---|---|---|
| 2007/0293282 A1 | 12/2007 | Lewis et al. | 455/575.1 |
| 2009/0181194 A1 | 7/2009 | Zhang et al. | 428/35.7 |
| 2011/0188180 A1* | 8/2011 | Pakula et al. | 361/679.01 |
| 2011/0215685 A1* | 9/2011 | Jarvis et al. | 312/223.1 |
| 2012/0229424 A1* | 9/2012 | Behles et al. | 345/177 |
| 2013/0250500 A1* | 9/2013 | Tossavainen et al. | 361/679.01 |
| 2013/0250502 A1* | 9/2013 | Tossavainen et al. | 361/679.01 |
| 2014/0145836 A1* | 5/2014 | Tossavainen et al. | 340/407.2 |

* cited by examiner

ATTACHING WINDOW ASSEMBLY USING OPTICAL WELDING

TECHNICAL FIELD

The exemplary and non-limiting embodiments of this invention relate generally to electronic devices and more specifically to attaching a window assembly (e.g., a glass window assembly) in electronic devices (e.g., mobile phones) using optical (laser) welding.

BACKGROUND ART

The following abbreviations that may be found in the specification and/or the drawing figures are defined as follows:
3D three-dimensional
Ga As gallium arsenide
GF glass fiber
IR infrared
LCD liquid crystal display
LED light-emitting diode
LASER light amplification by stimulated emission of radiation
PC polycarbonate
PDA personal digital assistant
PMMA polymethyl methacrylate Portable electronic devices with optical windows, such as mobile phones, camera-phones and personal digital assistants (PDAs) are widely used. Generally, with conventional fabricating methods, the optical window can be glued onto a housing or a main frame of the electronic device to ensure a high quality and frequently hermetic attachment/joining. However, the method of gluing is costly, requires a lot of space in components of the device and is difficult to implement. Therefore alternative methods are desired to overcome these drawbacks.

SUMMARY

In a first aspect of the invention, an apparatus, comprising: a window assembly comprising components which are substantially transparent to an optical beam, the components comprising an optical window with a laminated layer glued at selected areas to a backside of the optical window and a back print ink layer between at least portions of the backside of the optical window and of the laminated layer; and a frame, having at least one boundary with the laminated layer of the window assembly and being non-transparent to the optical beam at least in a vicinity of the at least one boundary with the laminated layer, wherein the window assembly is attached. In a second aspect of the invention, a method, comprising: providing a window assembly comprising components which are substantially transparent to an optical beam, the components comprise an optical window with a laminated layer glued at selected areas to a backside of the optical window and a back print ink layer between at least portions of the backside of the optical window and of the laminated layer; aligning the window assembly with a frame having at least one boundary with the laminated layer of the window assembly and being non-transparent to the optical beam at least in a vicinity of the at least one boundary with the laminated layer; and moving the optical beam along a predetermined path along a perimeter area of the optical window to join the window assembly and the frame by forming a welding joint line between the laminated layer and the frame at the at least one boundary, wherein the optical beam is focused on and absorbed in a vicinity of the at least one boundary by the frame to form the welding joint line.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1:
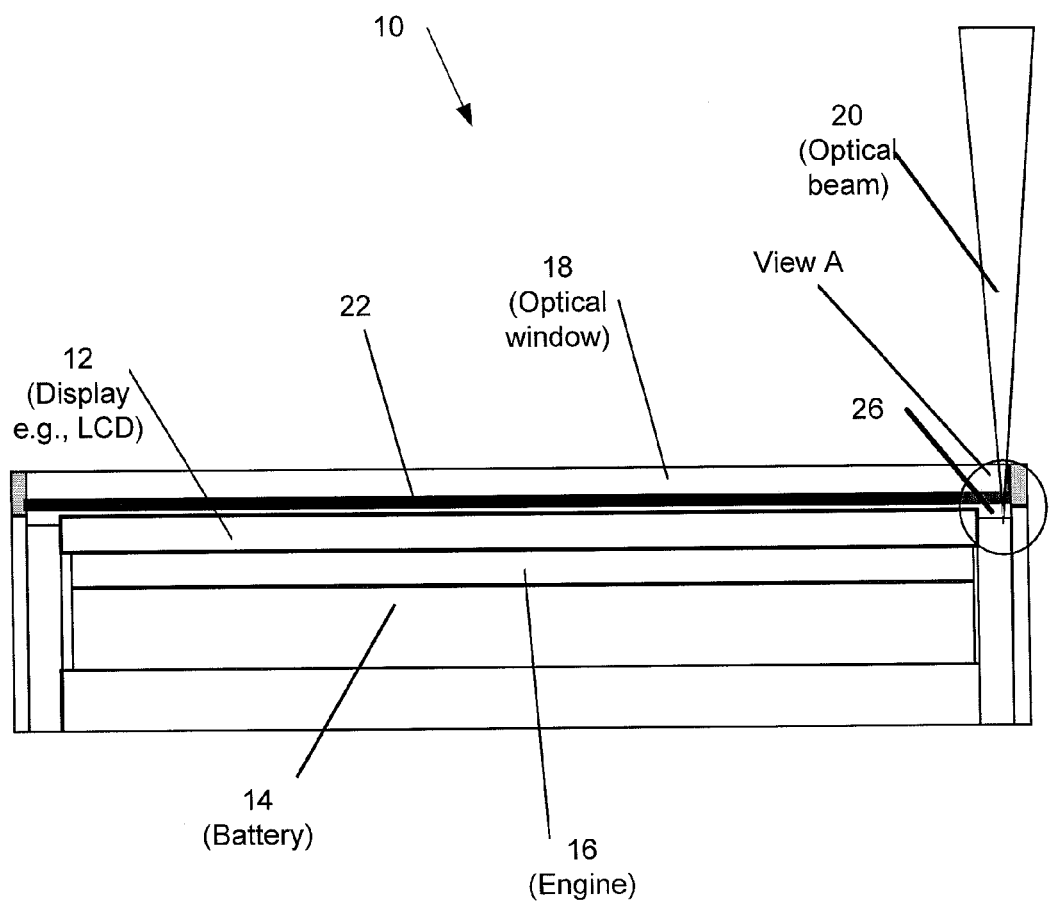
FIG. 1 is a sectional view of a display structure in an electronic device utilizing optical welding of a window assembly, according to an exemplary embodiment of the invention.

Laser welding for joining compatible plastic parts (e.g., having substantially close melting points) is conventionally used in electronic devices, e.g., for joining a plastic cover with the housing. When an optical glass window is required in an electronic device, using optical (laser) beam for welding the glass window directly to a housing/frame of the electronic device is not practical because of a high melting point of the glass. Using conventional gluing has its own limitations especially when it may be desirable to include in a glass window assembly a layer of a back print ink for display printings (e.g., black printing within the window), which may further limit the space available for gluing.

A new apparatus and method are presented for joining a window assembly (e.g., a glass window assembly) in electronic devices using optical (laser) welding. According to an embodiment of the invention, a window assembly comprises components which are substantially transparent to an optical beam, the components may comprise an optical window such as a glass window with a laminated layer (e.g., made of plastic) glued to a backside of the optical window and a back print ink layer between portions of the optical window and of the laminated layer. All elements of the window assembly may be transparent to the optical (laser) beam. This window assembly may be attached to a frame such as a plastic frame, non-transparent to the optical beam, having at least one boundary with the laminated (plastic) layer of the window assembly using a welding joint at the at least one boundary made by the optical beam propagating transparently (with negligible optical absorption) through the window assembly and absorbed by the plastic frame. It is further noted that only a portion of the frame adjacent to the with the laminated (plastic) layer can be made of the plastic material which may be glued to the rest of the frame made of a different material than plastic, e.g., of a glass material.

In other words, the optical beam focused on this at least one boundary and moving along a predetermined path along a perimeter area of the optical window can attach/join the window assembly and the (plastic) frame to form this welding joint between the laminated layer and the frame. The electronic device, comprising the window assembly attached to the frame using optical/laser welding as described herein, may be a mobile phone, a camera, a wireless video phone, a portable music device, a wireless computer, etc.

Moreover, the back print ink layer, being transparent to the optical beam in an infrared part of an optical spectrum, also may be non-transparent to light in a visible part of the spectrum, so that a line formed by the welding joint is not visible to a user of the apparatus from a front side (opposite to the backside) of the optical window through the back print ink layer. (It is noted that for the purpose of this invention the term "light" identifies a visible part of the optical spectrum.)

According to another embodiment, the optical beam may be a laser beam, e.g., having a wavelength approximately between 800 and 1100 nm in the infrared (IR), from a semiconductor GaAs laser. Other types of optical sources (lasers, LEDs) providing different wavelengths and powers may be used as a source of the optical radiation to form the optical beam with the required optical power density at the focal point on a surface of the frame at the boundary with the laminated layer.

According to a further embodiment, the laminated (plastic) layer can be made, e.g., of polycarbonate (PC), polystyrene, polymethyl methacrylate (PMMA) or similar materials. Also the laminated layer may be an extended edge of a polarizer of a display 12 comprised in the electronic device (see FIG. 1 discussed below). The layer of the back print ink (IR ink), transparent in the infrared, which can be used for display printings (black print within the window) may be a polycarbonate tape (or PC foil).

The frame may be made of a plastic material compatible with the material of the laminated plastic layer, e.g., having similar or higher melting point than the laminated layer. For example the plastic frame can be made from the polycarbonate (PC) or from a combination of the polycarbonate (PC) and a glass fiber (GF). Alternatively, only a portion of the frame adjacent to the at least one boundary with the laminated layer may be made of the plastic material. In another embodiment, as stated herein, the frame can be made of a glass material with the portion of the frame adjacent to the at least one boundary with the laminated layer and made of the plastic material glued to the glass material of the rest of the frame.

Moreover, the welding joint described herein may be hermetic because of a superior quality of the laser welding. In general, a width of the welding joint on the at least one boundary may be about 0.2 mm which can be quite smaller than required for the gluing technique, but may be reduced even further by tightly focusing the laser beam (e.g., using diffraction limited focusing). Also the welding joint may be re-workable, i.e., after the welding is done, the optical (laser) beam can follow the same track that was used for welding, so that the glass window assembly and the plastic frame may be separated and re-welded again if necessary.

Figure 2:
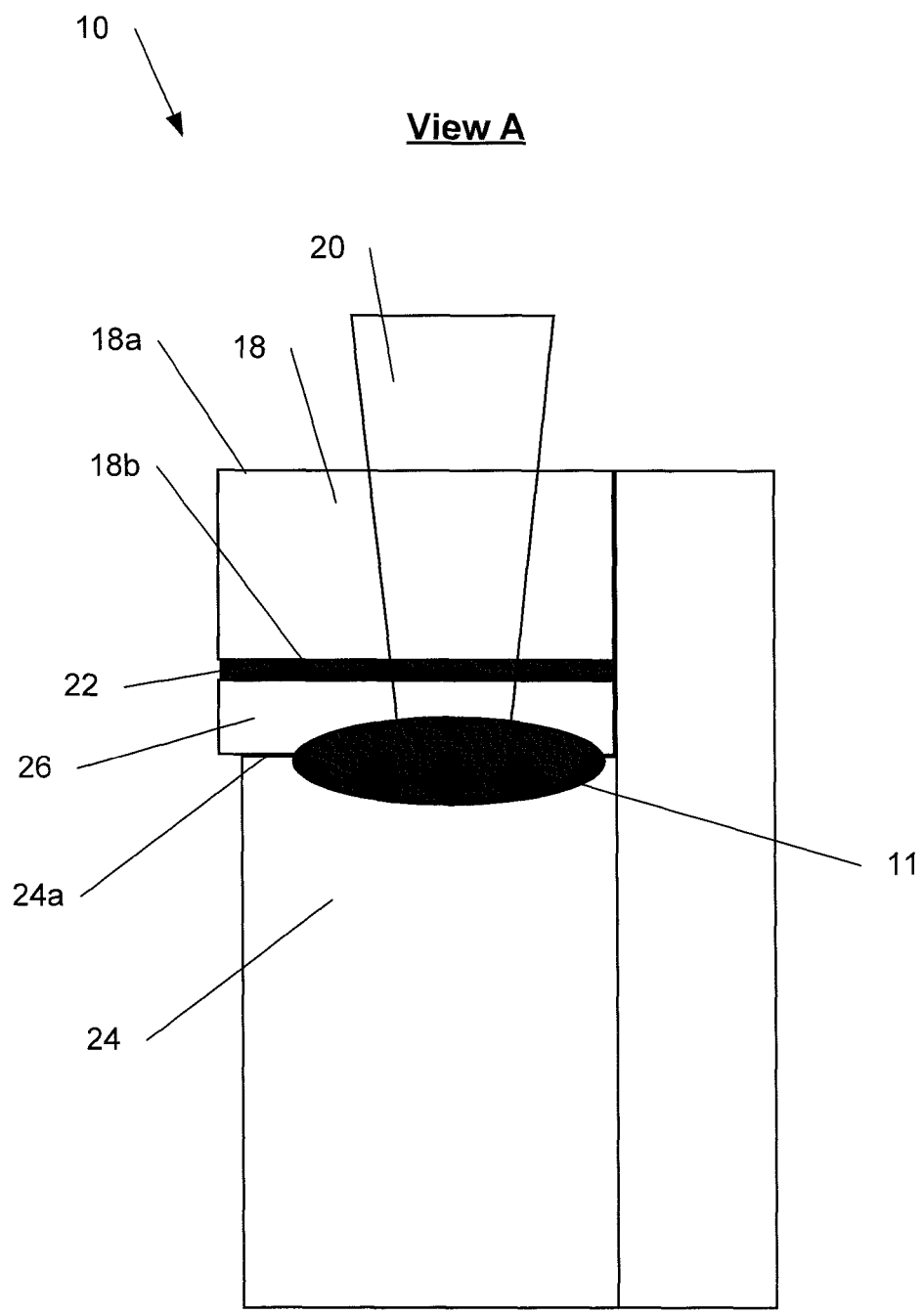
FIG. 2 is an example of a magnified sectional view of the welding area of the display structure of the device in FIG. 1, according to an exemplary embodiment of the invention.
Figure 3:
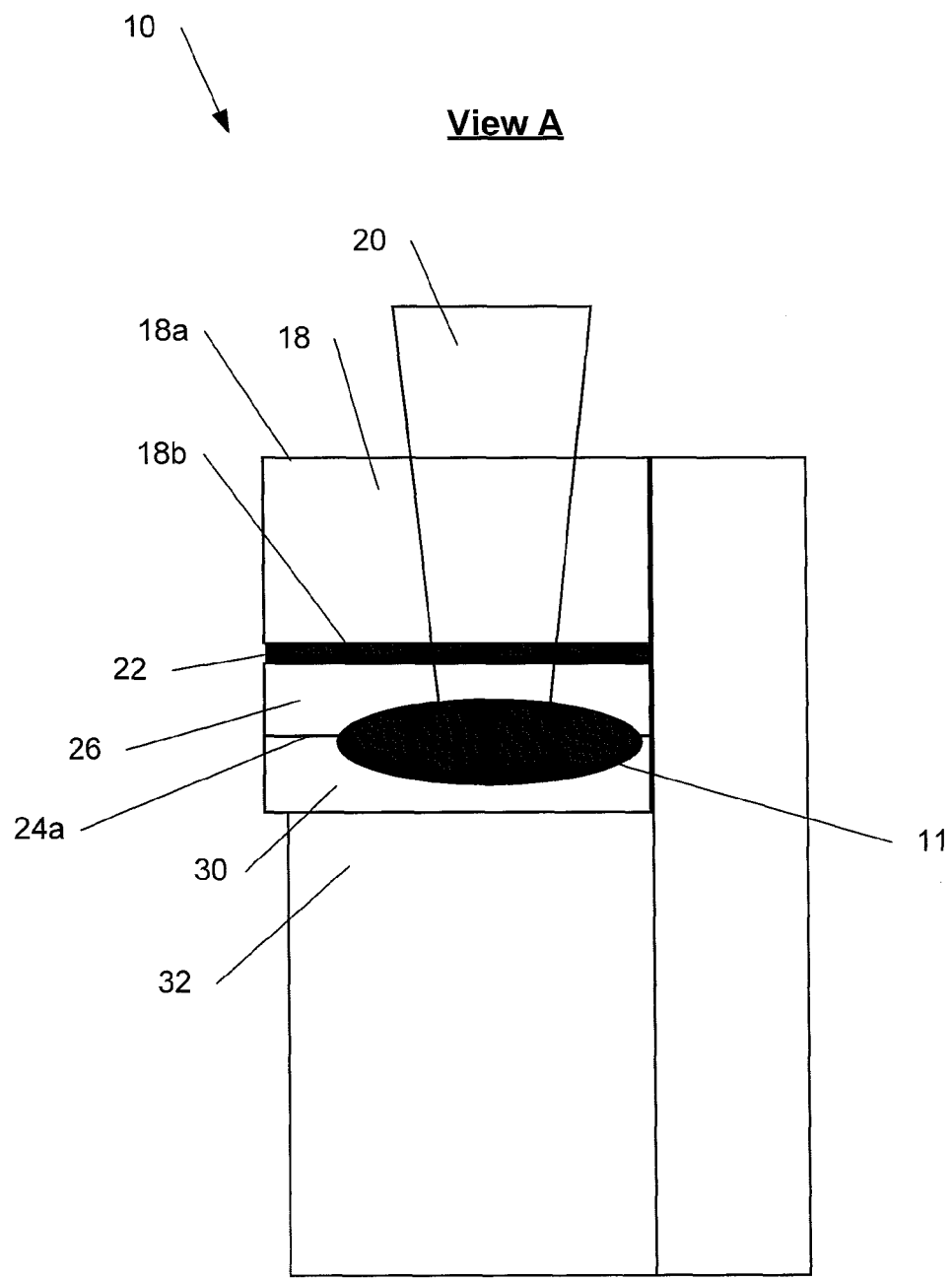
FIG. 3 is another example of a magnified sectional view of the welding area of the display structure of the device in FIG. 1, according to an exemplary embodiment of the invention.

FIGS. 1, 2 and 3 demonstrate optical welding of the window assembly described herein. FIG. 1 shows a side cross-sectional view of a display structure in an electronic device 10 utilizing optical welding of the window assembly, according to an exemplary embodiment of the invention. The display structure comprises conventional components such as a battery 14, an engine (e.g., an display engine) 16, a display (e.g., LCD display) 12, an optical window 18 (e.g., a glass widow, a touch window, a plastic window, etc.), and a frame (e.g., plastic frame or partially plastic frame as explained herein) 24. The display structure also comprises a laminated layer 26 (e.g., made of a plastic material) and a back print ink layer 22 (IR ink) between at least portions of the optical window 18 and of the laminated layer 26. The laminated layer 26 may be glued at selected areas/points (not shown in FIG. 1) to the optical window 18. The elements 18, 22 and 26 comprise the window assembly and they are transparent to the optical beam. This assembly is welded using optical (laser) beam 20 to the frame 24 as demonstrated in more detail in FIG. 2.

FIG. 2 shows an example of a magnified sectional view A of the welding area in the display structure of the device 10 of FIG. 1, according to an exemplary embodiment of the invention. The same elements are designated by the same reference numbers as in FIG. 1. The optical beam (e.g., from IR laser at the wavelength 800-110 nm) 20 is focused on a surface 24a of the frame 24. The beam 20 propagates substantially without attenuation through the optical window 18, and the layers 22 and 26 (which are substantially transparent to the optical beam 20). It is noted the for the purpose of the present invention, the term "substantially transparent" or "substantially without attenuation" means that the amount of the absorbed optical radiation in the optical window 18 and the layers 22 and 26 is small and does not cause any significant temperature rise in any of these components due the direct optical absorption by these components (their temperatures remains significantly below their corresponding melting temperatures).

Moreover, as noted herein, the frame can be made of a plastic material or at least a portion of the frame adjacent to the boundary (surface 24a) can be made of the plastic material such as polycarbonate (PC) and glass fiber (GF). The optical laser beam 20 can be absorbed by the frame plastic material near the surface 24a so the frame material is melted near the surface 24a and also melts an adjacent portion of the laminated plastic layer 26 (having approximately the same or slightly lower melting temperature) thus forming a welding joint 11 between the laminated layer 26 and the frame 24.

It is noted that the melting points of the plastic frame material near the surface 24a and the plastic material of the laminated layer 26 should have compatible melting points, e.g., the fame material may have similar or slightly higher melting point than the laminated (plastic) layer 26. Further, the power density provided by the laser beam 20 should be carefully chosen to be able to melt the frame material at the surface 24a. On the other hand this power density should be restricted not to provide excessive energy so that the heat can propagate beyond the laminated (plastic) layer 26 to cause damaging/deterioration of the back print ink layer 22. The thickness of the laminated (plastic) layer 26 may be also chosen appropriately to facilitate enough thermal isolation to the back print ink layer 22.

By moving an optical beam along a predetermined path along a perimeter area of the optical window 18, the window assembly can be attached to the frame 24 by forming a welding joint 11 (or welding joint line) along the perimeter area of the optical window 18 possibly forming a hermetic seal. As it is noted herein, this welding joint line may be re-workable. For example if the welding joint line is found to be defective after the welding is done, the optical (laser) beam can follow the same track (predetermined path) that was used for welding, so that the window assembly and the frame 24 may be separated, wherein the optical beam is focused on and absorbed in a vicinity of the at least one boundary by the frame 24. After separating the window assembly and the frame 24, the welding (described herein) may be re-worked.

As noted herein, the back print ink layer 22, being transparent to the optical beam in the infrared part of the optical spectrum, may be also non-transparent to light in the visible part of the spectrum, so that a line formed by the welding joint is not visible to a user of the electronic device from a front side 18a (opposite to the backside 18b) of the optical window 18 through the back print ink layer 22.

FIG. 3 shows another example of a magnified sectional view A of the welding area in the display structure of the device 10 of FIG. 1, according to an exemplary embodiment of the invention. The same elements are designated by the same reference numbers as in FIGS. 1 and 2. In this implementation the frame 32 can be a cover made of glass material with one portion (e.g., IR absorbing layer) 30 adjacent to the boundary 24a made of a plastic material and glued to the glass cover/frame 32. The functionality and properties of the plastic layer 30 for forming the welding joint 11 are the same as explained in reference to the plastic frame 24 in FIG. 2. Thus FIG. 3 demonstrates a technique to form an optical welding joint between the optical window 18 and the frame/cover 32 both made of the glass material.

Optical (laser) welding of the window assembly in electronic devices as described herein has a number of advantages over conventional gluing which include (but are not limited to):

the optical/laser welding is a simpler process than gluing;
the optical/laser welding has stronger strength than gluing;
the optical/laser welding results in thinner welding seams possible due strong joining strength and small focused spot size for the laser beam;
the optical/laser welding total cost is cheaper than for gluing due faster processing time;
the optical/laser welding creates possibility for 3D product shapes.

Table 1 below provides a comparison between the gluing and welding methods.

TABLE 1

Comparison of gluing and welding methods.

|  | Gluing | Laser welding |
| --- | --- | --- |
| Join strength (push out) | 450 | 850 |
| Typical Processing time | 10 s | 5-7 s |
| Cycle time | 10 s | 5-7 s |
| Needed joining width | 0.6-2 mm | 0.2-2 mm |
| Total cost per product | 0.12 | 0.075 € |

Figure 4:
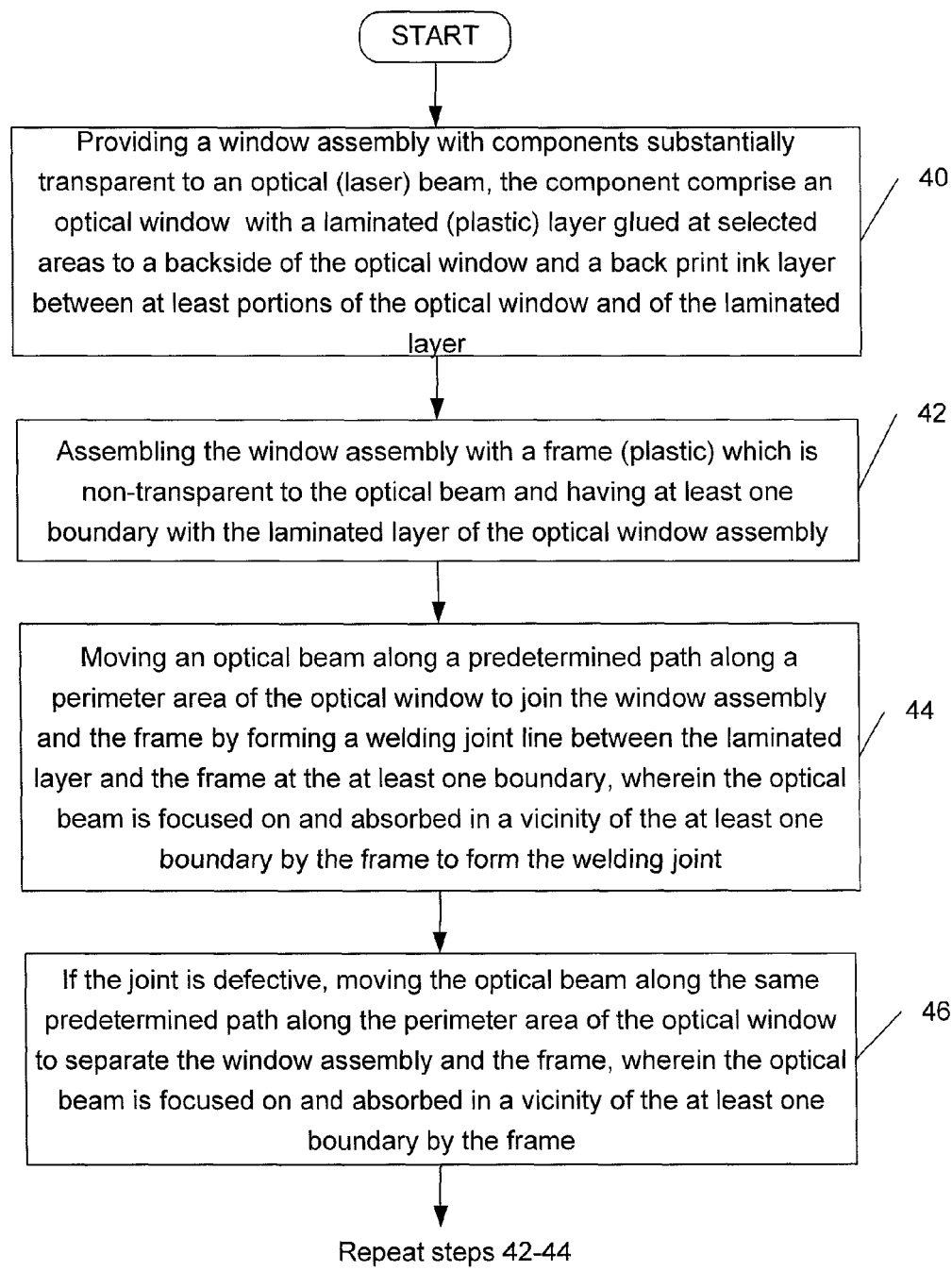
FIG. 4 is a flow chart demonstrating implementation of exemplary embodiments of the optical welding invention details herein.

FIG. 4 shows an exemplary flow chart demonstrating implementation of embodiments of the invention. It is noted that the order of steps shown in FIG. 4 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment shown in FIG. 4, in a first step 40, a window assembly comprising components substantially transparent to an optical (laser) beam is provided; the components in the window assembly comprise an optical window (e.g., glass touch window) with a laminated (plastic) layer glued at selected areas to a backside of the optical window and a back print ink layer (e.g., IR ink) between at least portions of the optical window and of the laminated layer. In a next step 42, the window assembly is assembled/aligned with a frame (e.g., made from plastic material) which is non-transparent to the optical beam and having at least one boundary with the laminated layer of the optical window assembly.

In a next step 44, the optical beam is moved along a predetermined path along a perimeter area of the optical window to join/attach the window assembly and the frame by forming a welding joint line between the laminated layer and the frame at the at least one boundary, wherein the optical beam is focused on and absorbed in a vicinity of the at least one boundary by the frame to form the welding joint line (see FIGS. 1-2 for details).

In a next step 46, if the welding joint is defective, moving the optical beam along the same predetermined path along the perimeter area of the optical window to separate the window assembly and the frame, wherein the optical beam is focused on and absorbed in a vicinity of the at least one boundary by the frame. After separating the window assembly and the frame, steps 42-44 may be repeated to rework the welding joint line.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. An apparatus, comprising:
a window assembly comprising components which are substantially transparent to an optical beam, the components comprising an optical window with a laminated layer glued at selected areas to a backside of the optical window and a back print ink layer between at least portions of the backside of the optical window and of the laminated layer; and
a frame, having at least one boundary with the laminated layer of the window assembly and being non-transparent to the optical beam at least in a vicinity of the at least one boundary with the laminated layer, wherein the frame comprises a glass portion and a plastic layer portion, wherein the plastic layer portion is between the laminated layer and the glass portion,
wherein the window assembly is attached to the frame at the at least one boundary with the laminated layer by a welding joint.

2. The apparatus of claim 1, wherein the window assembly is a glass window assembly, and wherein the welding joint is made using the optical beam propagating through the glass window assembly and absorbed by the frame.

3. The apparatus of claim 1, wherein the back print ink layer, being transparent to the optical beam in the infrared part of a spectrum, is non-transparent to light in a visible part of the spectrum, so that a line formed by the welding joint is not visible to a user of the apparatus from a front side of the window assembly through the optical window and the back print ink layer.

4. The apparatus of claim 1, wherein the frame or at least a portion of the frame adjacent to the at least one boundary is made of a plastic material.

5. The apparatus of claim 1, where the optical beam is a laser beam which has a wavelength between 800 and 1100 nm.

6. The apparatus of claim 1, wherein the laminated layer is made of polycarbonate, or the laminated layer is an extended edge of a polarizer of a display comprised in the apparatus.

7. The apparatus of claim 1, wherein the apparatus is a mobile phone, a camera mobile phone, a wireless video phone, a portable device or a wireless computer.

8. The apparatus of claim 1, wherein the laminated layer comprises a polycarbonate material.

9. The apparatus of claim 1, wherein a width of the welding joint on the at least one boundary is approximately 0.2 mm.

10. The apparatus of claim 1, wherein the welding joint is re-workable.

11. The apparatus of claim 1, wherein the plastic layer portion of the frame is adjacent to the at least one boundary, wherein the plastic layer portion is glued to a surface of the glass portion of the frame, and wherein the surface is substantially parallel to the backside of the optical window.

12. The apparatus of claim 1, wherein the welding joint is made using the optical beam propagating through the window assembly and absorbed by the plastic layer portion of the frame.

\* \* \* \* \*